United States Patent
Turner

(10) Patent No.: US 12,537,830 B2
(45) Date of Patent: Jan. 27, 2026

(54) PATTERN DISCOVERY AND DATA PROTECTION CORRELATION

(71) Applicant: JP Morgan Chase Bank, N.A., New York, NY (US)

(72) Inventor: Devecchio Turner, Colleyville, TX (US)

(73) Assignee: JP Morgan Chase Bank, N.A., New York, NY (US)

( * ) Notice: Subject to any disclaimer, the term of this patent is extended or adjusted under 35 U.S.C. 154(b) by 85 days.

(21) Appl. No.: 18/651,308

(22) Filed: Apr. 30, 2024

(65) Prior Publication Data
US 2025/0337756 A1    Oct. 30, 2025

(51) Int. Cl.
*H04L 9/40* (2022.01)

(52) U.S. Cl.
CPC ...... *H04L 63/1416* (2013.01); *H04L 63/1425* (2013.01)

(58) Field of Classification Search
CPC .......... H04L 63/1416; H04L 63/1425
See application file for complete search history.

(56) References Cited

U.S. PATENT DOCUMENTS

| | | | |
|---|---|---|---|
| 10,419,479 B2 * | 9/2019 | Gopalakrishna .... | H04L 63/1416 |
| 2016/0050222 A1 * | 2/2016 | Iyer ..................... | H04L 43/0876 726/1 |
| 2021/0240712 A1 * | 8/2021 | Oscherov .......... | G06F 16/24568 |
| 2024/0411880 A1 * | 12/2024 | Grover ................ | G06F 21/566 |

* cited by examiner

*Primary Examiner* — Anh Nguyen
(74) *Attorney, Agent, or Firm* — Wood IP Law, LLC; Theodore A. Wood

(57) ABSTRACT

Various methods, apparatuses, systems, and media for implementing endpoint detection and response and data protection correlation are disclosed. A correlation engine receives a data stream from multiple sources and one or more patterns. A processor analyzes the data to relate an event to the one or more patterns and executes a policy when the event matches the one or more patterns to identify suspected encrypted data files. The processor transfers the suspected encrypted data files and an encryption key to a controlled testing environment to use the encryption key to safely decrypt the suspected encrypted data files and to test the suspected encrypted data files to determine a potential network impact of executing each of the suspected encrypted files on the network. The processor detonates, from the controlled testing environment, the suspected data files confirmed during the testing to have a negative impact on the network.

19 Claims, 10 Drawing Sheets

PATTERN DISCOVERY AND DATA PROTECTION CORRELATION

FIELD OF TECHNOLOGY

The present disclosure relates generally to endpoint detection and response (EDR) and data protection correlation (DPC), and particularly, to enable Artificial Intelligence (AI) pattern discovery event correlation.

BACKGROUND

In today's digital environment, data is being generated at an unprecedented rate and has given rise to the term "big data", which refers to the large volume of structured and unstructured data that is generated on a continuous or a pre-determined basis. This data has the potential to provide insights that can create for a company new business opportunities for growth. Analysis of this massive amount of data can also be used as a defensive strategy, for example, through the accumulation of threat intelligence to predict and prevent cyber-attacks. Analysis of the data collected and making connections to determine patterns within the data provides the ability to defend against not just known but also unknown threats which can help to maintain a threat-free environment.

To harness the power of big data, tools are needed that can store, process, and efficiently analyze this data. With this increasing amount of data, it is critical to ensure that sensitive information is protected from cyber threats and breaches. Thus, cloud data protection has become a top priority for businesses and organizations of all sizes. Cloud data protection secures data stored online via cloud storage solutions by implementing various strategies, policies, controls, and technologies to protect data from threats.

There are effective security measures that offer robust data protections across endpoints and networks to protect data both in transit and at rest. One of the most effective data protection methods is to mandate that data within a data protection platform be encrypted.

However, data encryption poses a challenge to employing event correlation because there is no visibility into the state of the data, i.e., insights are unable to be derived from the encrypted data. Should an event, such as a cyber-attack, occur, this lack of visibility makes the encrypted data and the encrypted backup data on these platforms essentially off-limits for additional interrogation.

Thus, there is a need for a platform that discovers patterns to identify abnormal events to predict suspicious encrypted files. Namely, there is a need for a platform that is capable of providing insight into encrypted files.

SUMMARY

Given the aforementioned deficiencies, there is a need for a platform that offers AI powered pattern-based event correlation which enables electronic discovery (e-discovery) capability on encrypted data, targeted advanced insights into encrypted data, malware-detection in encrypted files, and customizable pattern capability. Such a platform can provide insight into encrypted data for a company's most critical assets, the ability to customize legal indexing for encrypted data, and provide malware "aware" recovery.

According to various embodiments, a platform is provided that is capable of discovering patterns to identify abnormal events to predict suspicious encrypted files. In various implementations, the platform is capable of providing insight into encrypted files.

The present disclosure, through one or more of its various aspects, embodiments, and/or specific features or sub-components, provides, inter alia, various systems, servers, devices, methods, media, programs, and platforms for implementing an endpoint detection and response and data protection correlation for various use-case (also spelled "use case") scenarios or applications, for example, network security technologies, such as in a malware scenario, but the disclosure is not limited thereto. For example, the various aspects, embodiments, features, and/or sub-components may also provide optimized processes of implementing the endpoint detection and response and data protection correlation in other use-cases, such as e-discovery, classification, and digital forensics.

In various embodiments, the endpoint detection and response and data protection correlation provides AI powered pattern-based event correlation which enables e-discovery capability on encrypted data, targeted advanced insights into encrypted data, malware-detection in encrypted files, and customizable pattern capability. Such a platform can provide insight into encrypted data for a company's most critical assets, the ability to customize legal indexing for encrypted data and provide malware "aware" recovery.

In other exemplary embodiments, a method for implementing endpoint detection and response and data protection correlation by utilizing one or more processors and one or more memories can include receiving a telemetry data stream from multiple sources in a network; analyzing the telemetry data stream from the multiple sources to relate an event to the one or more patterns; executing a policy for the event when the event matches the one or more patterns to identify suspected encrypted data files; obtaining an encryption key associated with the suspected encrypted data files; transferring the encryption key and the suspected encrypted data files to a controlled testing environment configured for using the encryption key to safely decrypt the suspected encrypted data files and for safely testing the suspected encrypted data files to determine, within the controlled testing environment, a potential network impact of executing each of the suspected encrypted files on the network; determining a specific marker for each of the suspected encrypted files based on the potential network impact; marking each of the suspected encrypted files with the specific marker; storing each of the suspected files with the specific marker in one or more storage devices; and detonating, from the controlled testing environment, any of the suspected encrypted data files confirmed during the testing to have a negative impact on the network Additional features, modes of operations, advantages, and other aspects of various embodiments are described below with reference to the accompanying drawings. It is noted that the present disclosure is not limited to the specific embodiments described herein. These embodiments are presented for illustrative purposes only. Additional embodiments, or modifications of the embodiments disclosed, will be readily apparent to persons skilled in the relevant art(s) based on the teachings provided.

BRIEF DESCRIPTION OF THE DRAWINGS

Illustrative embodiments may take form in various components and arrangements of components. Illustrative embodiments are shown in the accompanying drawings, throughout which like reference numerals may indicate corresponding or similar parts in the various drawings. The drawings are only for the purpose of illustrating the embodiments and are not to be construed as limiting the disclosure. Given the following enabling description of the drawings, the novel aspects of the present disclosure should become evident to a person of ordinary skill in the relevant art(s).

DETAILED DESCRIPTION

In the following detailed description of the present disclosure, reference is made to the accompanying drawings that form a part hereof, and in which is shown by way of illustration how one or more embodiments of the disclosure may be practiced. These embodiments are described in sufficient detail to enable those of ordinary skill in the art to practice the embodiments of this disclosure, and it is to be understood that other embodiments may be utilized and that process, electrical, and structural changes may be made without departing from the scope of the present disclosure.

The examples may also be embodied as one or more non-transitory computer readable media having instructions stored thereon for one or more aspects of the present technology as described and illustrated by way of the examples herein. The instructions in some examples include executable code that, when executed by one or more processors, cause the processors to carry out steps necessary to implement the methods of the examples of this technology that are described and illustrated herein.

Figure 1:
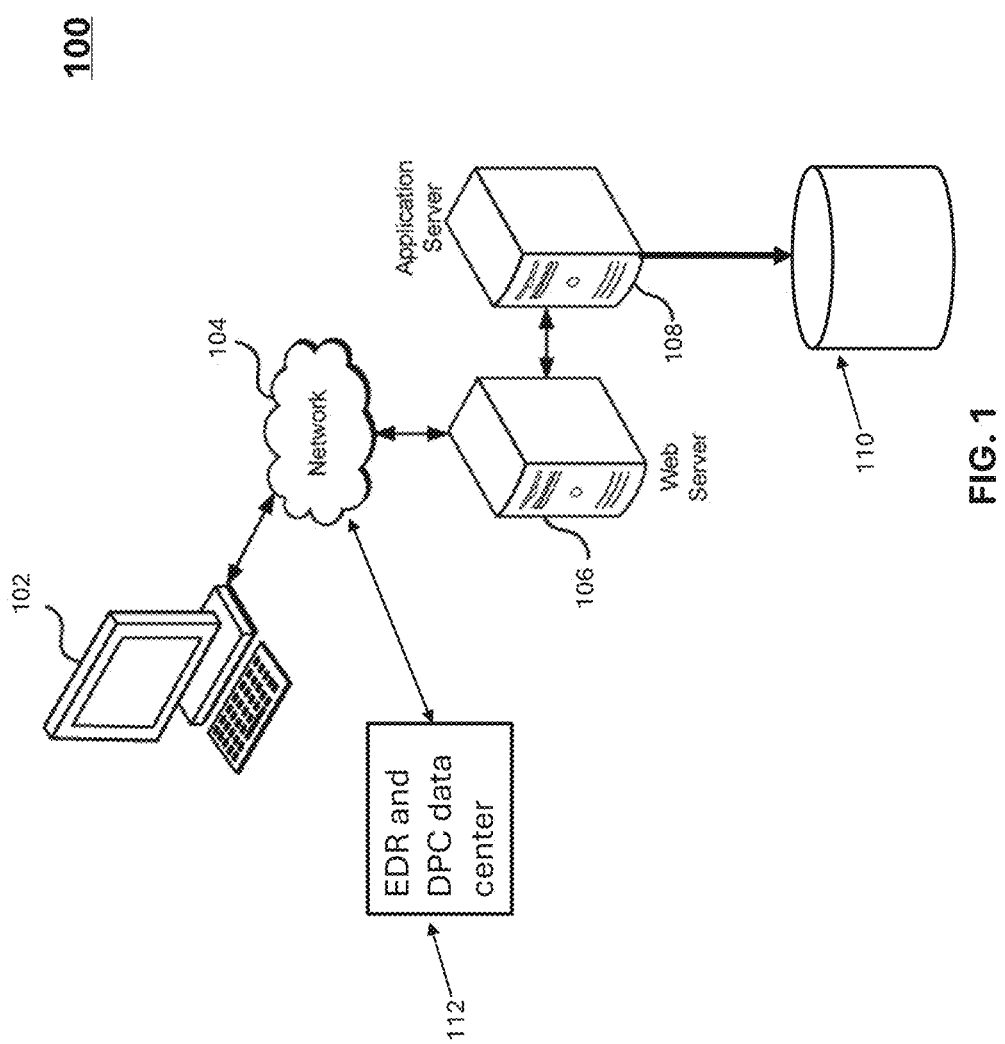
FIG. 1 illustrates an environment for implementing an EDR and DPC system, according to various embodiments.

FIG. 1 illustrates an example of a network EDR and DPC system 100, in which various implementations enable AI pattern discovery event correlation. The EDR and DPC system 100 provides anomaly detection for a network for efficient detection of patterns to identify unusual or unexpected behavior of one or more data center assets. Based on the identified patterns, the anomaly detection mechanism is capable of making predictions about potential indicators of compromise to encrypted data on the platform.

The anomaly detection mechanisms may be controlled by and inserted into the system 100 using an EDR and DPC data center 112. As illustrated in FIG. 1, the system 100 may also include a server 106, 108, a database(s) 110, one or more client devices 102, and a communication network 104.

According to exemplary embodiments, the EDR and DPC data center 112 may be connected to the server 106, and the database(s) 110 via the communication network 104. The EDR and DPC data center 112 may also be connected to one or more client devices 102 via the communication network 104, but the disclosure is not limited thereto. The EDR and DPC data center 112 may also obtain or exchange data with sources located on the Internet via communication network 104.

As will be appreciated, although a web-based environment is used for purposes of explanation, different environments may be used, as appropriate, to implement various embodiments. The environment includes a client device 102, which can include any appropriate device operable to send and/or receive requests, messages, or information over an appropriate network 104. In some embodiments, an appropriate device may convey information back to a user of the device. Examples of the client device 102 include personal computers, cell phones, handheld messaging devices, laptop computers, tablet computers, set-top boxes, personal data assistants, embedded computer systems, electronic book readers, and the like.

The network 104 can include any appropriate network, including an intranet, the Internet, a cellular network, a local area network, a satellite network, or any other such network and/or combination thereof. Components used for such a system can depend at least in part upon the type of network and/or environment selected. Many protocols and components for communicating via such a network are well-known and will not be discussed herein in detail.

Communication over the network 104 can be enabled by wired or wireless connections and combinations thereof. In this example, the network 104 includes the Internet and/or other publicly addressable communications network, as the environment includes a web server 106 for receiving requests and serving content in response thereto, although for other networks an alternative device serving a similar purpose could be used as would be apparent to one of ordinary skill in the art.

The illustrative environment includes at least one application server 108 and a data store 110. It should be understood that there can be several application servers, layers, or other elements, processes, or components, which may be chained or otherwise configured, that can interact to perform tasks such as obtaining data from an appropriate data store. Servers, as used herein, may be implemented in various ways, such as hardware devices or virtual computer systems. In some contexts, servers may refer to a programming module being executed on a computer system. As used herein, unless otherwise stated or clear from context, the term "datastore" or "data store" refers to any device or combination of devices capable of storing, accessing, and retrieving data, which may include any combination and number of data servers, databases, data storage devices, and data storage media, in any standard, distributed, virtual, or clustered environment.

The application server 108 can include any appropriate hardware/software/firmware for integrating with the data store 110 needed to execute aspects of applications for the client device 102, handling some or all of the data access and logic for an application. The application server 108 may provide access control services in cooperation with the data store 110. It can also generate content including, but not limited to, text, graphics, audio, video, and/or other content usable to be provided to the user. Such content may be served to the user by the web server in the form of Hypertext Markup Language ("HTML"), Extensible Markup Language ("XML"), JavaScript, Cascading Style Sheets ("CSS"), JavaScript Object Notation (JSON), and/or another appropriate client-side structured language.

Content transferred to the client device 102 may be processed by the client device 102 to provide the content in one or more forms including, but not limited to, forms that are perceptible to the user audibly, visually, and/or through other senses. The handling of all requests and responses, as well as the delivery of content between the client device 102 and the application server 108, can be handled by the web server using PHP: Hypertext Preprocessor ("PHP"), Python, Ruby, Perl, Java, HTML, XML, JSON, and/or another appropriate server-side structured language in this example. Further, operations described herein as being performed by a single device may, unless otherwise clear from context, be performed collectively by multiple devices, which may form a distributed and/or virtual system.

The environment, in one embodiment, is a distributed and/or virtual computing environment utilizing several computer systems and components that are interconnected via communication links, using one or more computer networks or direct connections. However, it will be appreciated by those of ordinary skill in the art that such a system could operate equally well in a system having fewer or a greater number of components than are illustrated in FIG. 1. Thus, the depiction of the system illustrated in the example environment 100 in FIG. 1 should be taken as being illustrative in nature and not limiting to the scope of the disclosure.

Referring to FIG. 1, the EDR and DPC data center 112 can be employed in various implementations. For example, as the value and use of information continue to increase in today's digital environment, the EDR and DPC data center 112 can be employed to process, compile, store, and/or communicate information or data to take advantage of the value of the information. The EDR and DPC data center 112 can also be used to analyze massive amounts of data to provide an anomaly detection strategy to predict potentially compromised encrypted data. The EDR and DPC data center 112 can analyze data collected and make connections to determine patterns within the data to identify an anomaly within the data center. For instance, the anomaly may be related to an unusual or unexpected behavior of one or more data center assets. Based on the identified pattern, the EDR and DPC data center 112 can predict potentially compromised encrypted data. Thus, according to various embodiments, the EDR and DPC data center 112 provides a platform that is capable of discovering patterns to identify abnormal events to predict suspicious encrypted files. In various implementations, the EDR and DPC data center 112 is capable of providing insight into encrypted files.

In various embodiments, the EDR and DPC data center 112 can employ event correlation tools to analyze large amounts of data streaming into the system 100 to relate various events to identifiable patterns. These event correlation tools can identify patterns and connections in data that indicate a relationship. The event correlation tools can take data from either application logs or host logs and then analyze the data to identify relationships. These relationships can help to identify various anomalous events. One of the benefits of event correlation is that it turns raw data into actionable alerts, alarms, and reports with the advantage of user-defined rules. Then, the appropriate action can be executed.

In addition, in various embodiments, the EDR and DPC data center 112 may be implemented to provide various network anomaly detection technologies that work together to share information. These network anomaly detection technologies may include, for example, Network Access Control (NAC), EDR, event management, and analytics tools. NAC provides the network visibility to see everything connected to the network, as well as the ability to control those devices and users, including dynamic, automated responses. The visibility of such clients 102 may include analysis of telemetry data changes to indicate the behavioral state of the clients to observe, detect, and respond to data center issues affecting groups of clients or clients 102 in system 100.

Event management systems (e.g., security information and event management (SIEM) security products) are capable of receiving alerts and/or generating alerts based on data collected from various controls. Analytics tools (e.g., user entity behavior analytics (UEBA)) assist in connection with protecting enterprises by monitoring users and endpoints and identifying potential anomalous behavior.

The EDR facilitates the detection of anomalous events on endpoints and the orchestration of appropriate responses. In the example embodiment of system 100 illustrated in FIG. 1, endpoints may include clients, client machines, thin clients, or virtual machines of a system. As used herein, an endpoint may also be referred to as a "client", as such the terms "endpoint" and "client" may be used interchangeably.

The client 102 and the servers 106, 108 may be executed on any suitable server, blade, computer, electronic device, virtual machine, or other suitable apparatus. Client 102 and the servers 106, 108 may be communicatively coupled over a network 104. Furthermore, each of the client 102 and server 106, 108 may include a memory communicatively coupled to a processor. The client 102 and the servers 106, 108 as well as the components of the client 102 and the servers 106, 108 may be implemented by applications, scripts, drivers, firmware, code, application programming interfaces, functions, or other suitable elements. These components may include instructions within the memory for execution by the processor. The instructions, when read and executed by the processor, may cause the processor to perform the functionality of the elements of system 100.

In certain embodiments, the EDR and DPC data center 112 may detect the occurrence, or predicted occurrence, of an anomalous event within the data center by inspecting the client 102. Inspection of the client 102 may be performed to determine whether the client 102 is exhibiting patterns indicative of the occurrence of an anomalous event. The EDR and DPC data center 112 may employ an event correlation tool to take data from either application logs or host logs and then analyze the data to identify relationships. In essence, the event correlation technique relates various events to identifiable patterns, analyzes the patterns to determine the underlying problem, and assigns the appropriate action to resolve it quickly to minimize any impact to the network. If the identified patterns indicates the occurrence, or predicts a future occurrence, of an anomalous event, then a corrective action can be imposed to resolve the data center issue.

Figure 2:
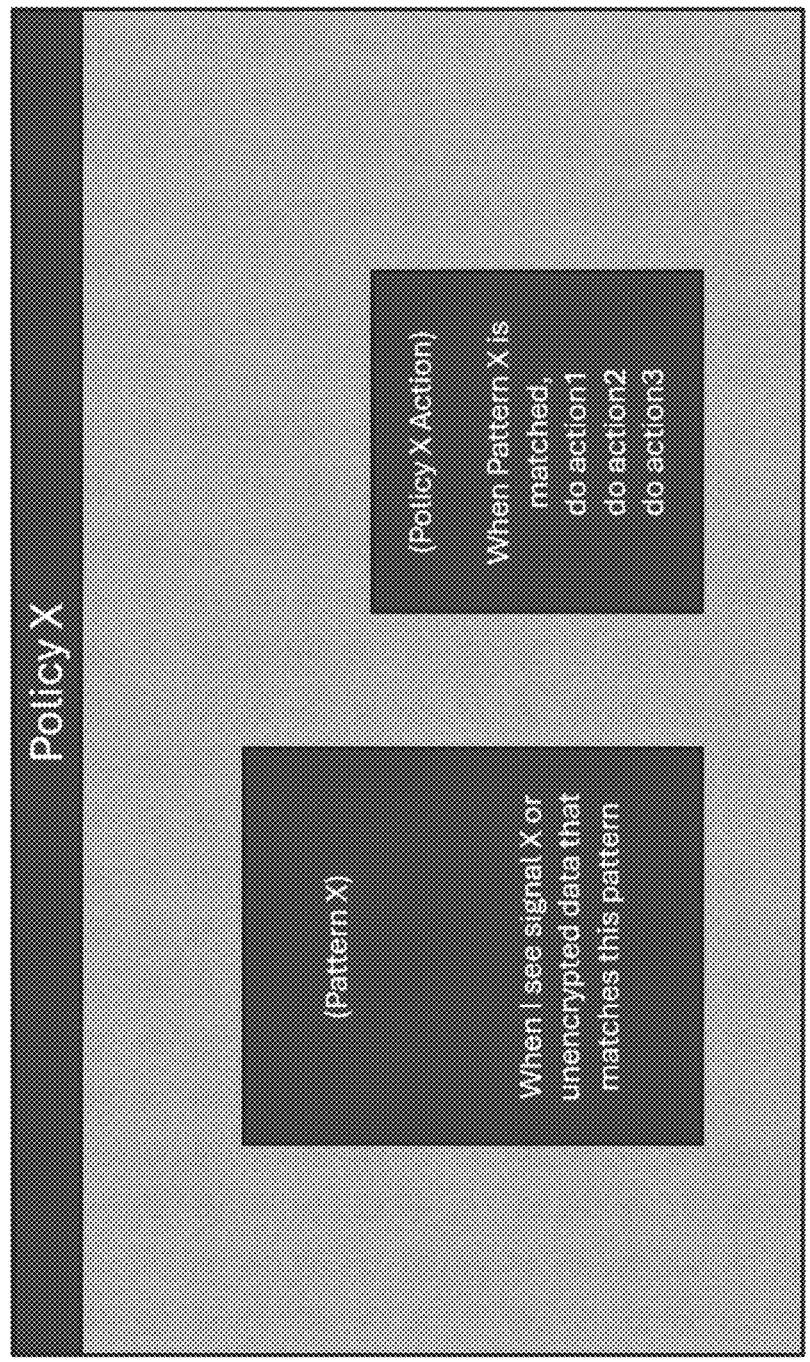
FIG. 2 illustrates an exemplary AI pattern definition and policy response operations in accordance with an exemplary embodiment.

For example, as shown in FIG. 2, in certain embodiments, the EDR and DPC data center 112 may employ AI pattern definition and policy response operations 200 to detect a data center issue by recognizing the pattern of a particular data center issue. AI pattern definition and policy response operations 200, herein, refers to the use of AI, machine learning (ML), anomaly detection, analytics, policies, rules, or a combination thereof, to automate the identification and resolution of a particular data center issue. In various embodiments, the AI pattern definition and policy response operations provide insight into the collected data to determine the reason for the data center issue and to resolve the issue. In certain embodiments, the AI pattern definition and policy response operations may be performed automatically and/or dynamically in real-time.

In various implementations, the AI pattern definition and policy response operations 200 can analyze telemetry data to discover patterns indicative of various use-case scenarios or applications. For example, the discovered patterns can identify specific use-case scenarios, such as malware-detection in encrypted files, E-discovery capability on encrypted data, targeted advanced insights into encrypted data, customizable pattern capabilities, and predictive analytics. Based on the anomalous event identified for the particular use-case, the AI pattern definition and policy response operations 200 can recommend a corresponding policy or corrective action to be implemented. It is to be understood by a person skilled in the art that the example use-cases described herein shall not be constructed as limiting the scope of the present disclosure.

As an example of the AI pattern definition and policy response operations 200, in FIG. 2, when various events relate to an identifiable pattern that indicates an anomalous event, such as when signal X or unencrypted data matches a predetermined pattern, the system can automatically and/or dynamically determine to implement, for example, action 1, action 2, or action 3, in real-time depending upon the state of the network.

Figure 5:
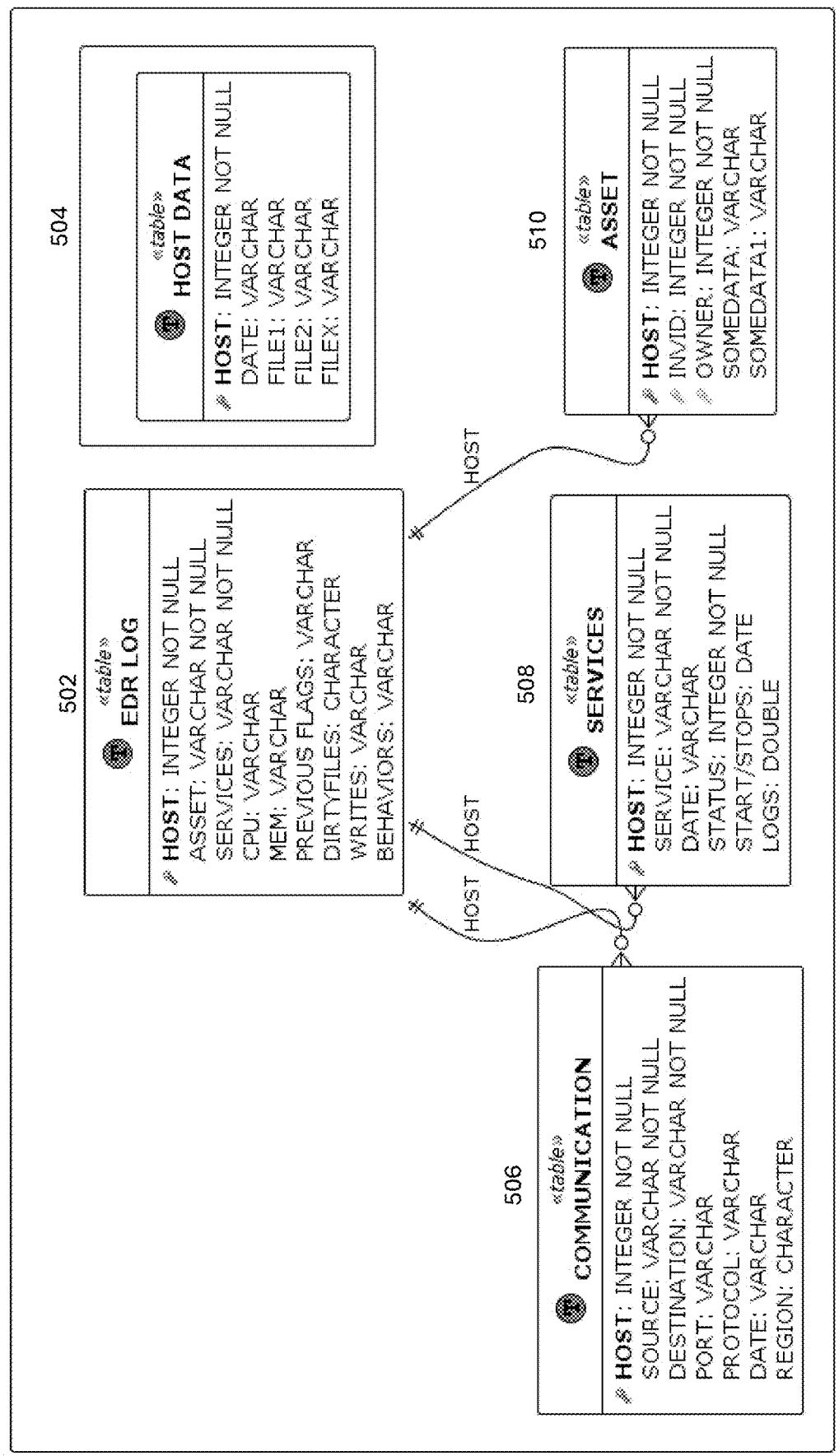
FIG. 5 illustrates tables of exemplary metadata files created using an EDR and DPC system, according to an exemplary embodiment.

To detect the occurrence of associated events and data center issues, the collected event and data center issue data may include, as shown in the exemplary tables 500 in FIG. 5, an EDR log table 502, a host data table 504, a communication table 506, a services table 508, and an asset telemetry table 510 associated with a particular data center asset.

In various embodiments, the EDR log table 502 may include information corresponding to the occurrence of an event for a particular EDR. The EDR log table 502 provides a log of events that occur at an EDR and/or in the network, such as problems, errors, or information on the current state of operation. Based on, for example, historical data, design configuration data or a combination of both, a message or log entry is recorded for each such event. These log entries can then be used to analyze activity, identify trends, monitor and understand the operation of the network, and help predict future events.

According to the present disclosure, a host is any computer or other devices connected to or accessible over the network 100. The host can be a client, server, or any other type of computer. The host may work as a server offering resources, services, and applications to users or other hosts on the network. The host can send or receive data, services, and applications. In various embodiments, the host data table 504 may include a hostname, which is the host's unique identifier that allows other computers to access it, a domain name, an IP address and any other additional information for identifying attributes of the host.

According to the present disclosure in various embodiments, host also include a virtual host and a virtual private server (VPS). The virtual host can provide online infrastructure solutions to numerous users simultaneously, including servers, computers, and storage via the Internet. Additionally, with virtualization, the virtual host can isolate users on the same server allowing each of them to be supplied with their own resources. The VPS can function as a virtual machine that utilizes virtualization to split a physical server into multiple virtual instances, enabling the host to deploy multiple sites from one machine. Each user of the VPS has their own set of system resources without being affected by the performance of the other websites with which they share the physical server.

Various embodiments may employ a communication log that functions as an application that collects the host's communication session information conducted with other entities on the network. The collected communication session information of the communication table 506 may include date, time, importance, relevance, and entities involved with a communication session.

According to the present disclosure, various embodiments provide public or private cloud services wherein virtualization allows the pooling of hardware resources to support virtual machines in a software-defined networking environment, such as EDR and DPC data center 112. Administration of EDR and DPC data center 112 can be simplified by virtualizing storage, such as a virtual machine disk (VMDK). Storage virtualization can operate on numerous storage devices, making them a single storage pool. Pooled storage devices may come from several suppliers and networks. Available storage capacity can be discovered from across different arrays and storage media, combined, maintained, and made available to applications. Multiple VMDKs can also be combined to create larger virtual disks.

In various embodiments, the services table 508 may include services provided by the host to users or other hosts on the network. "Service" means a consumable program offering, in a cloud computing environment or other network or computing system environment, which provides resources to multiple programs or provides resource access to multiple programs, or does both.

"Cloud" means pooled resources for computing, storage, and networking which are elastically available for measured on-demand service. A cloud may be private, public, community, or a hybrid, and cloud services may be offered in the form of infrastructure as a service (IaaS), platform as a service (PaaS), software as a service (SaaS), or another service.

Unless stated otherwise, any discussion of "Files and/or Programs" is used broadly herein, to include applications, kernels, drivers, interrupt handlers, firmware, state machines, libraries, and other code written by programmers (who are also referred to as developers) and/or automatically generated.

In various embodiments, the asset telemetry data 510 may include information corresponding to the operational status of a particular data center asset.

The historical data collected in FIG. 5 may be processed to identify changes in a data center asset's telemetry that may infer, directly or indirectly, a change to the data center's asset's operational status. Metrics associated with the identified changes are then processed employing event correlation techniques to discover a pattern to determine if an anomalous event has occurred or predict if an anomalous event will occur.

Once an anomalous event on one or more clients or EDRs has been detected for a particular data center asset, the AI pattern definition and policy response operations 200 can flag the host associated with the particular data center asset. The AI pattern definition and policy response operations 200 can then generate a list of encrypted files associated with the flagged host.

The AI pattern definition and policy response operations 200 can identify the list of encrypted files for further investigation and examination to determine whether the selected encrypted files has an impact on the network. Thus, the AI pattern definition and policy response operations 200 provides a platform that is capable of discovering patterns to identify abnormal events to predict suspicious encrypted files. The AI pattern definition and policy response operations 200 is capable of providing insight into encrypted files.

To further investigate and examine the encrypted files, the encrypted files can be tested in an isolated, controlled environment to safely determine their impact on the network. To further investigate and examine the selected suspicious encrypted files, the selected suspicious encrypted files can be executed in a controlled testing environment, such as a sandbox, which is isolated from the rest of the network. The controlled testing environment can be implemented, for example, in a virtual machine in a virtual environment. The AI pattern definition and policy response operations 200 can retrieve the decryption keys to execute by decrypting the encrypted files. During the controlled testing process, monitoring tools are employed to monitor and observe the file's actual running behavior and information is gathered about the file. The information can be transformed into features, which are analyzed using, for example, AI or machine learning models, to make a good or bad determination about the suspicious encrypted file.

Based on the decryption results, the AI pattern definition and policy response operations 200 can make a determination whether execution of the encryption file will have a negative impact or a positive impact to the network. An example of a negative impact determination is the discovery that the suspected encrypted files include malware that will have a harmful impact to the network. An example of a positive impact determination is the discovery that the suspected encrypted files are ransomware free backup data that can be safely used to transform any lost encrypted information back into its original format. Optionally, in various embodiments, the AI pattern definition and policy response operations 200 can make a determination whether execution of the encryption file will have no impact to the network.

Based on the execution results within the controlled testing environment, markers can be used to identify the encrypted files as "good data" or "bad data". The encrypted files having the designated markers of either "good data" or "bad data" are sent to a policy and metadata collection engine (PMCE).

Once identified with a marker for "bad data", these encrypted files are confirmed as being deleterious to the network. The system can then perform a detonation process on the encrypted files identified by the bad data marker. The detonation process can be performed at the controlled testing environment to completely delete any remnants of the encrypted files identified by the bad data marker from this virtual instance and to restore the temporary testing storage environment to a clean environment. After the detonation process, only a single copy of the encrypted file identified with the bad data markers will be stored in the system.

Based on the results of the determination of the impact of the suspicious encrypted files to the network and the identified abnormal event, the AI pattern definition and policy response operations 200 can then make a policy or course of action recommendation to resolve the one or more of the detected data center issues. For instance, if it is determined that the suspected encrypted files include malware that will have a harmful impact to the network, the AI pattern definition and policy response operations 200 may recommend a policy that prevents the decryption of the suspicious encrypted files.

Figure 3A:
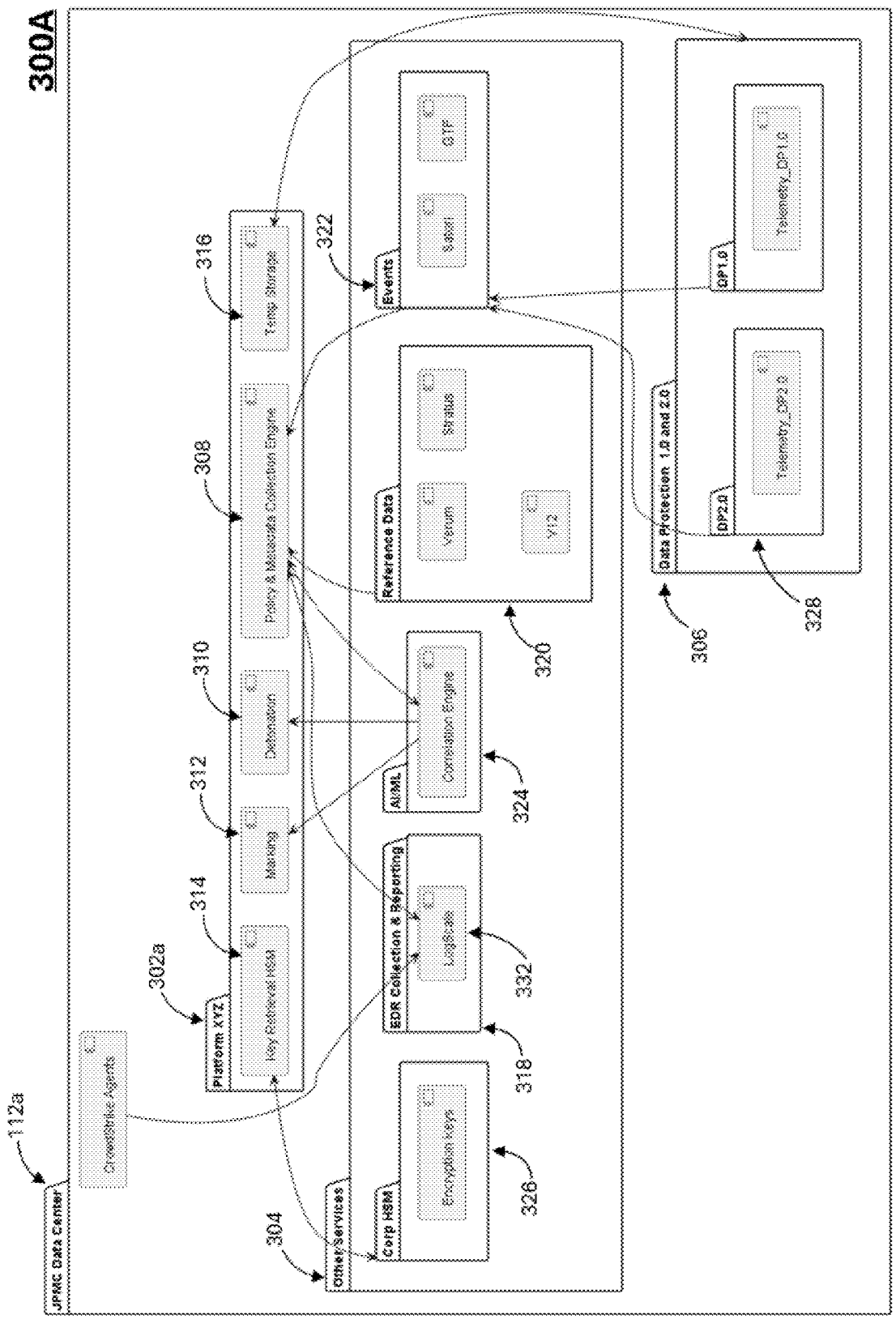
FIG. 3A illustrates an exemplary EDR and DPC data center in accordance with an exemplary embodiment.

FIG. 3A illustrates a general overview of the implementation of an EDR and DPC technique 300A as a solution wherein the EDR and DPC data center 112a employs AI pattern definition and policy response operations to interrogate encrypted data to prevent harm to the network. The EDR and DPC data center 112a can be used to analyze massive amounts of data to provide an anomaly detection strategy to predict potentially compromised encrypted data. The EDR and DPC data center 112a can analyze data collected and make connections to determine patterns within the data to identify an anomaly within the data center.

The solution, according to the present disclosure, is agnostic to the use-case, and the AI pattern definition and policy response operations 200 can be used for any number of use-case scenarios, such as malware-detection in encrypted files, E-discovery capability on encrypted data, targeted advanced insights into encrypted data, customizable pattern capabilities, and predictive analytics.

In FIG. 3A, the EDR and DPC data center 112a can include three main components, namely, a pattern discovery for encrypted files (PDED) platform 302a, other services 304, and a data protection platform 306.

By way of example only, and not limitation, the PDED platform 302a includes pattern logic and response generation logic that determines the action to take to generate a response if an event matches a specific pattern. The PDED platform 302a is capable of discovering patterns to identify anomalous events to provide insight into encrypted files. The PDED platform 302a can include a PMCE 308, detonation tool 310 and, marking tool 312, a key retrieval tool 314, and temporary storage 316. The other services 304 can include an EDR collection and reporting tool 318, a reference data tool 320, an events tool 322, an AI/ML platform 324, and a corporation hardware security module (HSM) 326. The data protection platform 306 can include telemetry data 328 as shown, for example, in the Tables 500 of FIG. 5.

In use, the PMCE 308 collects data from the EDR reporting and collection tool 318, which includes log data module 332. The reference data tool 320 collects reference data identifying which host the EDR or client device flagged as experiencing an anomalous event belongs to. Reference data may include file attributes, such as the file name and size, its current state, its revision timestamp, creation data, modification date, user permission, metric changes, and/or other file attributes. The reference data may be obtained from the PMCE 308.

The events tool 322 can be used by the process to capture events to generate an events log. In certain embodiments, the events log may include information corresponding to the occurrence of an event during a particular data center issue. For example, a particular event, such as a malware program copying itself to another client, can be identified and listed in the events log as an anomalous event.

The AI/ML platform 324 may use a correlation engine 330 to employ AI pattern definition and policy response operations to detect a data center issue by recognizing the pattern of a particular data center issue. The AI/ML platform 324 can use AI, ML, anomaly detection, analytics, policies, rules, or a combination thereof, to automate the identification and resolution of a particular data center issue. In various embodiments, the AI pattern definition and policy response operations provide insight into the collected data to determine the reason for the data center issue and to resolve the issue.

The data protection platform 306 includes telemetry data 328 as shown, for example, in the Tables 500 of FIG. 5 and as described above. The telemetry data 328 may include information corresponding to the operational status of a particular data center asset. The telemetry data may also extend to and include all logs, metrics, events, and traces that are created by applications in the system. The historical data collected in FIG. 5 may be processed to identify changes in a data center asset's telemetry that may infer, directly or indirectly, a change to the data center's asset's operational status. Metrics associated with the identified changes are then processed employing event correlation techniques to discover a pattern to determine if an anomalous event has occurred or predict if an anomalous event will occur.

Further, in various embodiments, data protection platform 306 may be implemented using one or more containers that are deployed using a cloud-based network. Each container can control the exposure of data privacy elements and can be executed in any network environment in a way that is isolated from its environment. The container may include stand-alone, executable code that can be executed at runtime with all necessary components, such as binary code, system tools, libraries, and settings.

The PMCE 308 receives all the information collected by the EDR collection and reporting tool 318, the reference data tool 320, the events tool 322, and the AI/ML platform 324.

Once an anomalous event on one or more clients or EDRs has been detected for a particular data center asset, the PDED platform 302a can flag the host associated with the particular data center asset. Once identified and flagged as a host of the particular data center asset, such as an EDR or client exhibiting abnormal behavior, the system then scans the network and local storage for critical data files that the flagged host has uploaded to the system within a predetermined time period, such as within the last 30 days. The critical data files includes the encrypted data files because the critical data files consist of or comprise critical, sensitive, or confidential data, or a combination thereof which are encrypted during transit or rest when stored on the network.

In certain examples, responsive to a determination that the one or more data items include critical files comprising encrypted data, the PDED platform 302a can then generate a list of encrypted files associated with the flagged host.

The PDED platform 302a can now identify this list of suspicious encrypted files for further investigation and examination to determine whether the selected encrypted files has an impact on the network. The list of suspicious encrypted files can then be stored in the data protection platform 306.

The temporary storage tool 316 may be used to further analyze, inspect and examine each data file on the list of suspicious encrypted files. Data can be pulled from the data protection platform 306 into the temporary storage tool 316. The temporary storage tool 316 can be used as a controlled testing environment that provides a tightly controlled and closely monitored protected environment in which the data of the suspicious encrypted files, which could possibly be harmful to the network, can be safely run and monitored. The suspicious encrypted files can be executed in the controlled and isolated temporary storage tool 316 to prevent any harm from the suspicious encrypted files from spreading to other components of the system.

The key retrieval tool 314 retrieves an encryption key (not shown) via an application programming interface (API) from the corporation HSM 326. Since all of the data of the suspicious files is encrypted, the encryption key is used to decrypt the encrypted data within the temporary storage tool 316. Once the data is decrypted, the system can scan the data within the temporary storage tool 316.

Based on the decryption results, the PDED platform 302a can make a determination whether the decryption of the encryption file will have, for example, a negative impact, a positive impact, or no impact to the network. Based on the results of the scanned data, the marking tool 312 can mark the scanned data, for example, as either "good data" or "bad data". The marking is not limited to merely identifying the data as either good or bad data. Additional actions can be taken to add additional markings, such as "confidential" to the data in an e-discovery use-case scenario.

The encrypted files having the designated markers, for example, of either "good data" or "bad data" are sent to the data protection platform 306.

If the marking tool 312 marks the suspicious encrypted file as bad data, the system can perform a detonation process to completely delete any remnants of that file from the controlled testing environment of the temporary storage tool 316.

After the detonation process, a single copy of the encrypted file identified with the bad data markers will remain in the system stored at the data protection platform 306.

Figure 3B:
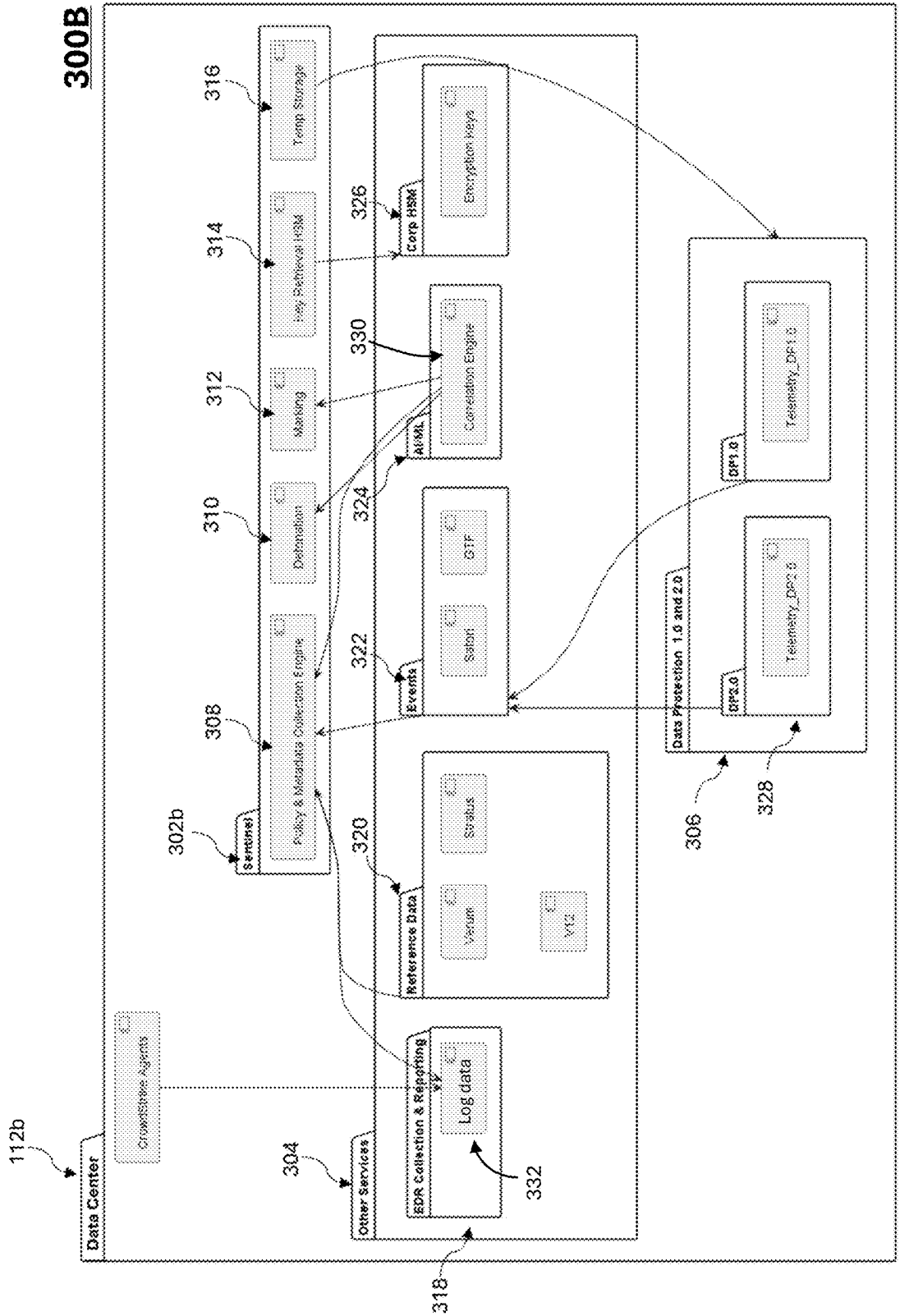
FIG. 3B illustrates an exemplary EDR and DPC data center in accordance with another exemplary embodiment.

In comparison to the general overview of the implementation of an EDR and DPC technique 300A of FIG. 3A, FIG. 3B depicts an exemplary first use-case scenario 300B illustrating malware-detection in encrypted files in accordance with some embodiments of the present disclosure. The implementation of the exemplary first use-case scenario 300B illustrating malware-detection in encrypted files is similar to the general overview of the implementation of the EDR and DPC technique 300A in FIG. 3A. For the sake of brevity, only aspects of the exemplary first use-case scenario 300B, which are different from the general overview of the EDR and DPC technique 300A in FIG. 3A will be described below. To the extent illustrated in FIG. 3A, similar components in FIG. 3B are designated by similar reference numerals.

Referring to FIG. 3B, FIG. 3B illustrates the implementation of the first use-case scenario 300B as a solution wherein the EDR and DPC data center 112b employs AI pattern definition and policy response operations to interrogate encrypted backup data before it is used to restore any infected or lost data to mitigate or prevent harm from malicious software to the network.

In FIG. 3B, the EDR and DPC data center 112b can include three main components, namely, a sentinel platform 302b, other services 304, and a data protection platform 306. In comparison to FIG. 3A, the first use-case scenario 300B of FIG. 3B includes a sentinel platform 302b. In addition to having the same or similar capabilities of the PDED platform 302a in FIG. 3A for discovering patterns to identify anomalous events to provide insight into encrypted files, sentinel platform 302b also provides a method and apparatus for protecting network resources from malicious attacks.

In general, backup encryption is a security best practice that adds an additional layer of security by converting sensitive information into an unreadable format. It is important to back up the data for quick recovery in the event of a cybersecurity incident and to ensure that the backups are protected by encryption. Even if threat actors manage to intercept the data while in transit, they cannot access or read the encrypted backup data without the decryption key.

One problem with using encrypted backup data to restore the original data is that the encrypted backup data may unknowingly be infected with malware. Attempts to recover and restore lost or infected data using encrypted backup data may not be reliable and can cause further harm to the system. Encryption of the backup data affects visibility into the data and can potentially hide malicious software. Encrypted backup data poses a challenge to employing conventional event correlation techniques because there is no visibility into the backup data encrypted at rest or transit. Namely, conventional event correlation tools are unable to derive insights from the encrypted data. This makes the backup encrypted data on these conventional platforms essentially off-limits for additional interrogation.

Due to the lack of visibility, the backup data may be unknowingly compromised with malicious software. As used herein, the term "lack of visibility" means that there is "no visibility" into the encrypted data. The malicious software can appear innocuous until restored and activated, upon which the malicious software may attempt to steal information from the network and/or do harm to the network. Malicious software is typically designed to spread itself to other systems in a network. Examples of malicious software include viruses, ransomware, trojan horses, spyware, rootkits, keyloggers, and rogue security software, among others. If the backup data saved by the host flagged as infected is later restored, for example, from a VMDK, then any host within the blast radius is susceptible if the backup data is also infected.

During use, the EDR and DPC data center 112b in FIG. 3B can be used to analyze massive amounts of data to provide a defensive strategy through the accumulation of threat intelligence to predict and prevent cyber-attacks. The EDR and DPC data center 112b can analyze data collected and make connections to determine patterns within the data to defend against not just known but also unknown threats which can help to maintain a threat-free environment. In various embodiments, the EDR and DPC data center 112b may be configured to profile the network environment, detect suspected threats to the network, analyze the suspected threats, and analyze the network for exposure and/or vulnerability to the suspected threat.

The events tool 322 can be used by the process to capture events to generate an events log. In certain embodiments, the events log may include information corresponding to the occurrence of an event during a particular data center issue. For example, a particular event, such as a malware program copying itself to another client, can be identified and listed in the events log as an anomalous event.

The event correlation tools 322 can identify patterns and connections in data that indicate a relationship. The event correlation tools can take data from either application logs or host logs and then analyze the data to identify relationships. These relationships can help to identify various anomalous events indicative of malware at one or more of the clients 102. These relationships can help to identify active attacks, help protect against attacks, as well as provide insight into the relationship between attacks, indicate which attacks pose the biggest threats, and help to prevent future attacks.

The AI/ML platform 324 may use a correlation engine 330 to employ AI pattern definition and policy response operations to detect a data center issue by recognizing the pattern of a particular data center issue. The AI/ML platform 324 can use AI, ML, anomaly detection, analytics, policies, rules, or a combination thereof, to automate the identification of a malware detection at one or more of the clients 102.

The historical data collected in FIG. 5 may be processed to identify changes in a data center asset's telemetry that may infer, directly or indirectly, a change to the data center's asset's operational status. Metrics associated with the identified changes are then processed employing event correlation techniques to discover a pattern to determine if an anomalous event has occurred or predict if an anomalous event will occur.

In FIG. 3B, once an event of a compromise of system 100 by malicious activity on one or more of the clients 102 has been detected for a particular data center asset, the sentinel platform 302b can flag the host associated with the particular data center asset. Once identified and flagged as a host of the particular data center asset, such as an EDR or client exhibiting abnormal behavior, the system then scans the network and local storage for critical data files that the flagged host has uploaded to the system within a predetermined time period, such as within the last 30 days. The critical data files includes the encrypted data files.

In certain examples, responsive to a determination that the one or more data items include critical files comprising encrypted data, the sentinel platform 302b can then generate a list of encrypted files associated with the flagged host.

The EDR and DPC data center 112b enables correlation and flagging between EDR logs and backups submitted by infected hosts which will enable the flagged encrypted backup files to be further scrutinized, quarantined, and/or cleaned while maintaining privacy concerns for sensitive data, decryption key data, and backup data.

As described above, the temporary storage tool 316 may be used to further analyze, inspect and examine each data file on the list of suspicious encrypted backup files. Data can be pulled from the data protection platform 306 into the temporary storage tool 316. The temporary storage tool 316 can be used as a controlled testing environment that provides a tightly controlled and closely monitored protected environment in which the data of the suspicious encrypted backup files, which could possibly be harmful to the network, can be safely run and monitored. The suspicious encrypted backup files can be executed in the controlled and isolated temporary storage tool 316 to prevent any harm from the suspicious encrypted files from spreading to other components of the system.

Figure 4:
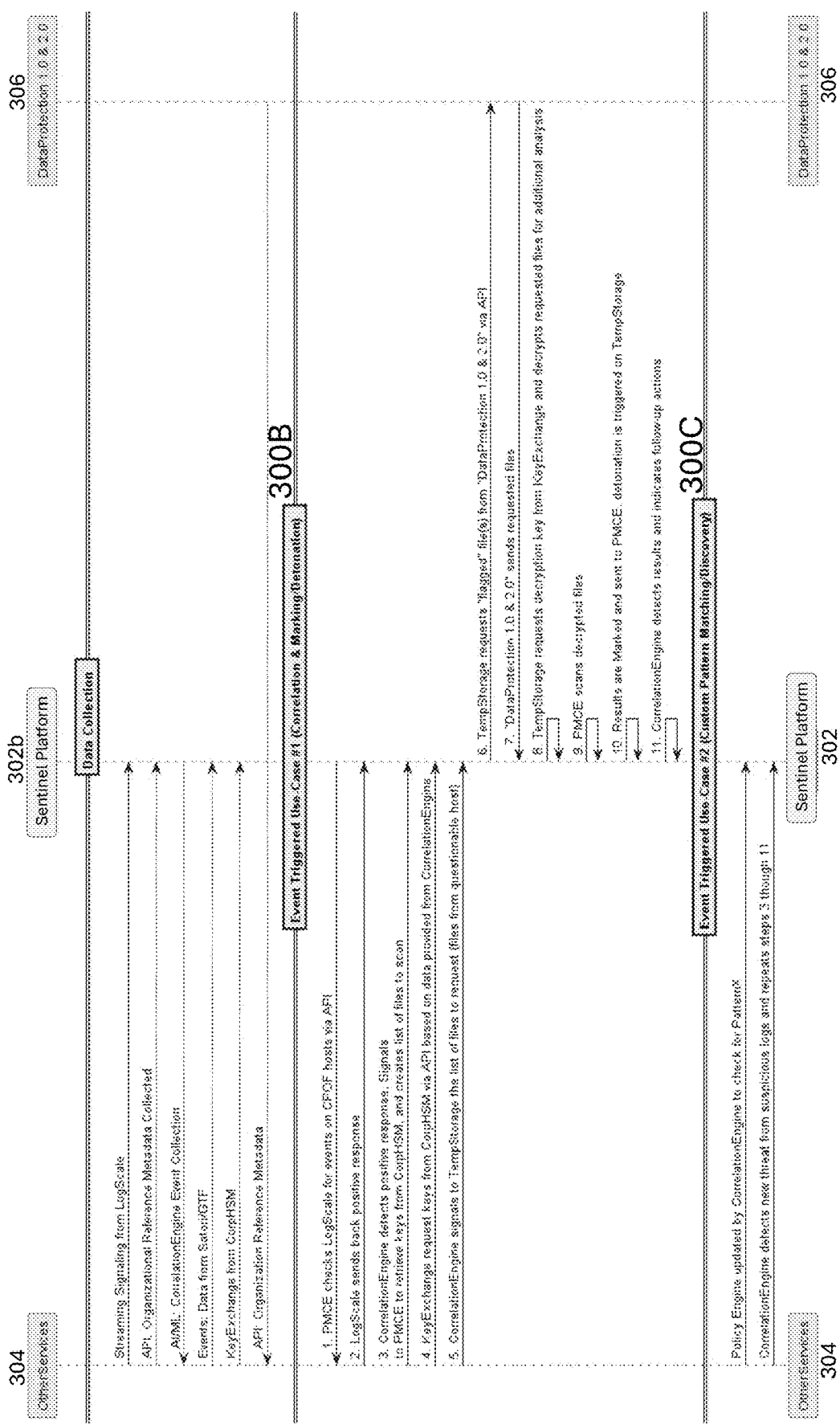
FIG. 4 illustrates a sequence diagram for operating an EDR and DPC system according to various embodiments of the present disclosure.

FIG. 4 is an exemplary sequence diagram 400 of the operation of a system for EDR and DPC (e.g., the system 100) for enabling AI pattern discovery event correlation according to various embodiments of the present disclosure. The sequence diagram 400 details an example of the first use-case scenario 300B illustrating malware-detection in encrypted files of FIG. 3B. FIG. 4 provides an example of the first use-case 300B, wherein a signal is detected regarding an abnormality pattern on a tracked host. The AI/ML platform uses data collected from the PMCE to recommend the list of files to scan based on host behavior including communication patterns, files backed up, running services, and files submitted by that host over a given period of time.

FIG. 4 also provides an example of an alternative use-case scenario 300C detailing the sequence of a custom pattern matching/discovery scenario.

In FIG. 4, the system performs data collection. This stage may be, for example, a steady state and may only collect metadata for use when needed. The process streams signals from the log scale 332 module to the sentinel platform 302b. Organization reference metadata can be collected using the reference data tool 320 and sent to the sentinel platform 302b via an API. The correlation engine 330 can feed the AI/ML platform 324 with collected metadata enabling continual tracking or trending on data exchanged, backed-up data, and/or hosts behavioral patterns. This data is used to identify key information regarding flagged hosts and any data needed to trigger decryption within the sentinel platform 302b.

During the data collection process, the telemetry data 328 flows into the system at a steady state into the data protection platform 308. The event tool 322 analyzes the telemetry data for behavioral changes indicative of an anomalous event. When the event tool 322 detects or predicts an occurrence of an anomalous event, the system seeks to determine what event has occurred within the system.

The event tool 322 sends instructions to the sentinel platform 302b that a host has been infected. The corporation HSM 326 sends the encryption keys to the sentinel platform 302b. The sentinel platform 302b sends the organization reference metadata to the reference data tool 320 via an API.

In FIG. 4, when an anomalous event has been detected, the sequence begins a correlation and marking/detonation process. The sentinel platform 302b may query the log data module 332 to determine which host has been infected. The PMCE 308 checks the log data module 332 in the EDR reporting and collection tool 318 for anomalous events occurring on a host via an API. The log data module 332 sends the sentinel platform 302b a response that a host has been infected. The correlation engine 330 detects the positive response from the log data module 332, signals to the PCME 308 to retrieve the encryption keys from the corporation HSM 326, and creates a list of files to scan.

The sentinel platform 302b may scan the network for critical files to obtain a list of encrypted files from the host that need to be analyzed to determine whether that host is putting infected data on the platform. The sentinel platform 302b requests to exchange the encryption key from the corporation HSM 326 based on the list created by the correlation engine 330.

The correlation engine 330 signals to the temporary storage 316 the list of suspicious encrypted files to request. The list of suspicious encrypted files are the files transmitted from the flagged host. To determine the specific files that should be collected, the system communicates with the AI/ML platform which monitors all the data and the transactional history of the host. For instance, the AI/ML may compile and provide a report to the system listing all organizations that have been in communication with the host within a specified time, such as in the last 30 days. Namely, these are the services that were running on the system from the host in the last 30 days.

These are the events that appear suspicious from an AI/ML standpoint that the system needs to further examine and inspect. The system collects all this information to get an overall better assessment and understanding of the occurrence of the event. The system then sends the list of files to the data protection platform via an API. The data protection platform 306 responds and provides the requested files to the sentinel platform 302.

After the suspicious encrypted files have been identified, an encryption key-exchange process commences and the files will be decrypted and scanned within the sentinel platform 302. The results will then be marked as either good data or bad data. After the results have been presented, the data is detonated within the sentinel platform 302b. Data will be detonated within an established timeframe and proof of the detonation will be provided to the owner of the host.

The temporary storage 316 requests the flagged suspicious encrypted files from the data protection platform 306. The sentinel platform 302b also requests the encryption keys from the host to decrypt the files so that they can be further analyzed for malicious software within the controlled testing environment of the temporary storage 316. The data protection platform 306 sends the requested files to the temporary storage 316, The temporary storage 316 obtains the encryption keys to decrypt the encrypted files so they can be scanned for malicious software. The PMCE 308 scans the decrypted files. The scanned results are marked using the marking tool 312 and sent to the PMCE 308. The marking tool 312 marks the scanned results as either good data or bad data and sends a report of the results to the PMCE 308 and the AI/ML platform 324. Then, a detonation process performed by the denotation tool 310 is triggered on the temporary storage 316 to detonate any of the encrypted files determined to have a negative impact on the network. The correlation engine 330 detects the results of the report and indicates follow-up actions. The report is then sent to the owner of the host informing the owner of the status of its environment. If the host is infected, the report will indicate that protective cybersecurity measures should be implemented.

In FIG. 4 with regards to the example of an alternative use-case scenario 300C detailing the sequence of a custom pattern matching/discovery scenario. The PMCE 308 is updated by the correlation engine 330 to check for a predetermined pattern. The correlation engine 330 detects any new threats from the suspicious logs and repeats steps 3 and 11 shown in FIG. 4.

In certain embodiments, rather than having predetermined established patterns, the system can provide customizable patterns by dynamically searching for, defining, and detecting patterns. If a match is detected based on the pattern, the system can determine dynamically in real-time one or more recommendations for resolving any data center issues.

FIG. 5 illustrates an exemplary table 500 of DPC and EDR data mining attributes. The method and system of the present disclosure enable automatic information retrieval through AI/ML and rule-based data mining. The PMCE 308 can stream telemetry data from various sources identified earlier to the AI/ML platform 324 ultimately resulting in a set of tables such as an EDR log table 502, a host data table 504, a communication table 506, a services table 508, and an asset table 510, as depicted in FIG. 5 and as described above. The AI/ML platform 324 may use this data to create a suggested list of files to be retrieved from the data protection platform 306 for additional scanning and inspection.

The EDR log 502 may include client detection and reporting information. The system collects a variety of metrics for the flagged host. Regarding the host, the system obtains information, such as the asset tags, the host services that are running on the system, memory, CPU, write behavior, and any anomaly-based information.

The system then determines which other entities in the environment the host has communicated with since the host was infected, the communication protocols, the dates, the ports, and also the state of the services on that particular host with the host being the primary key.

In certain embodiments, because the AI/ML platform 324 collects the data in the background, the AI/ML platform 324 can use the collected information to make one or more inferences to make certain connections or assumptions to learn details about the operation and status of the host at a specific time. The data is used to generate a list of suspicious encrypted files that the system requests from the data protection platform and then transfers to the sentinel platform to be decrypted, scanned, and assessed to determine to what extent the infection has affected the system.

Steps for implementing methods 600A-D of an EDR and DPC that enables AI pattern discovery event correlation in conjunction with various use-case scenarios are depicted in the flow charts of FIGS. 6A-6D according to various embodiments of the present disclosure.

Figure 6A:
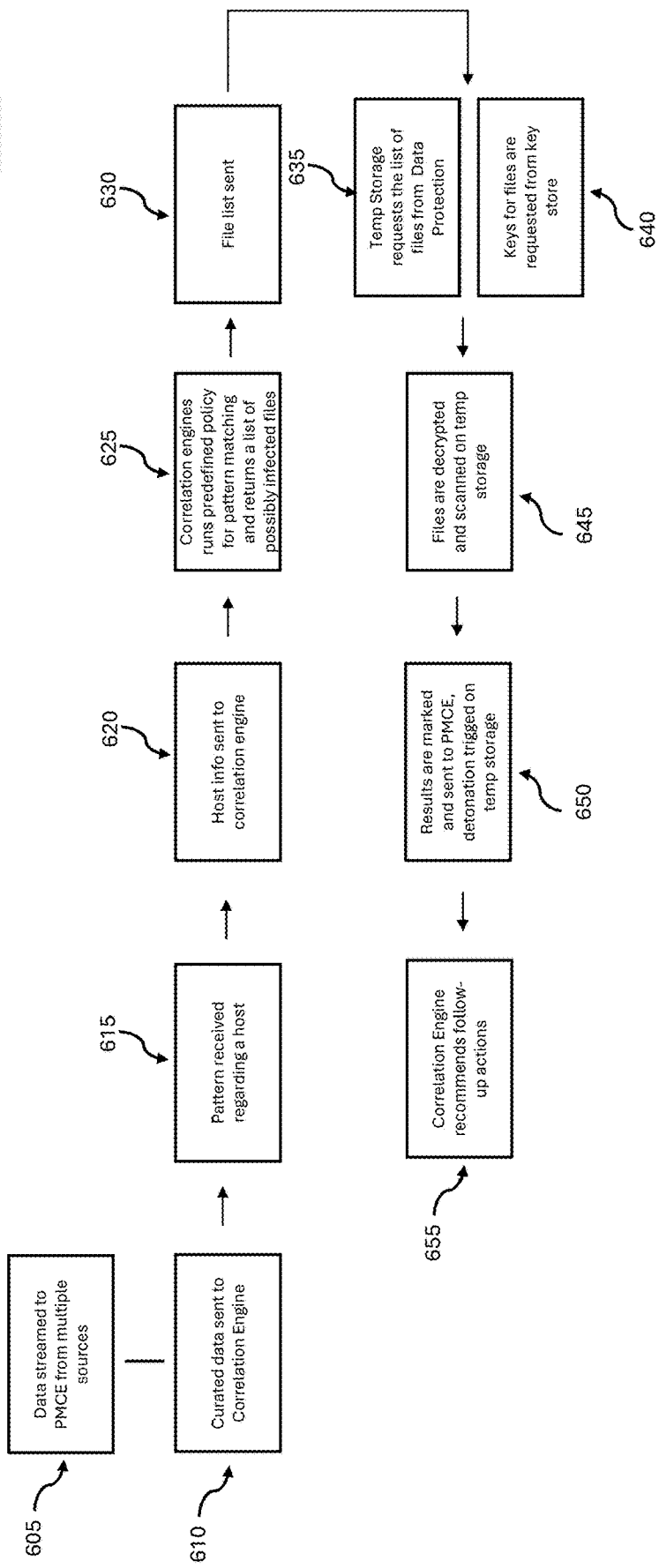
FIGS. 6A-D are flowcharts of an exemplary process for implementing an EDR and DPC system, according to various exemplary embodiments.

FIG. 6A depicts an exemplary first use-case scenario 600A illustrating malware-detection in encrypted files.

Figure 6B:
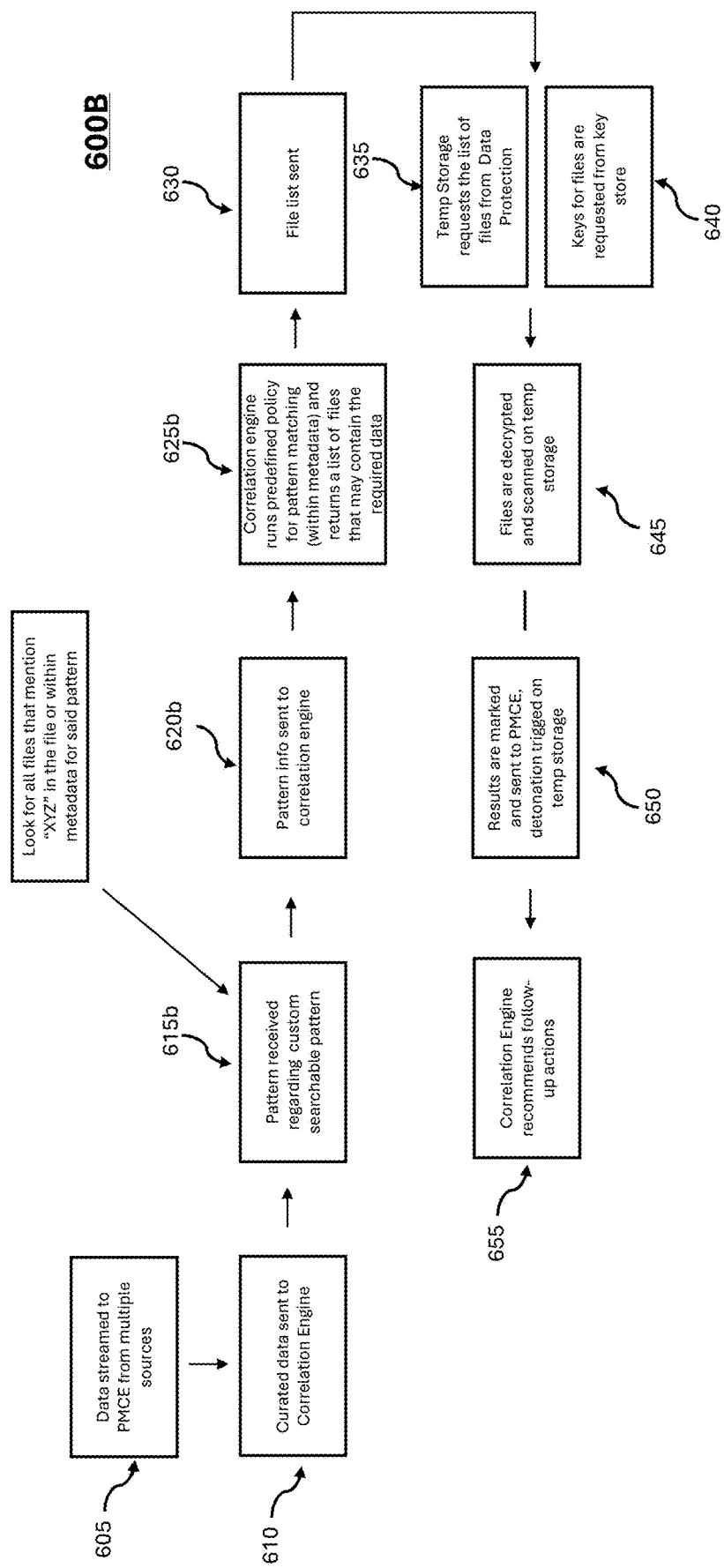

FIG. 6B depicts an exemplary second use-case scenario 600B illustrating e-discovery capability on encrypted data.

Figure 6C:
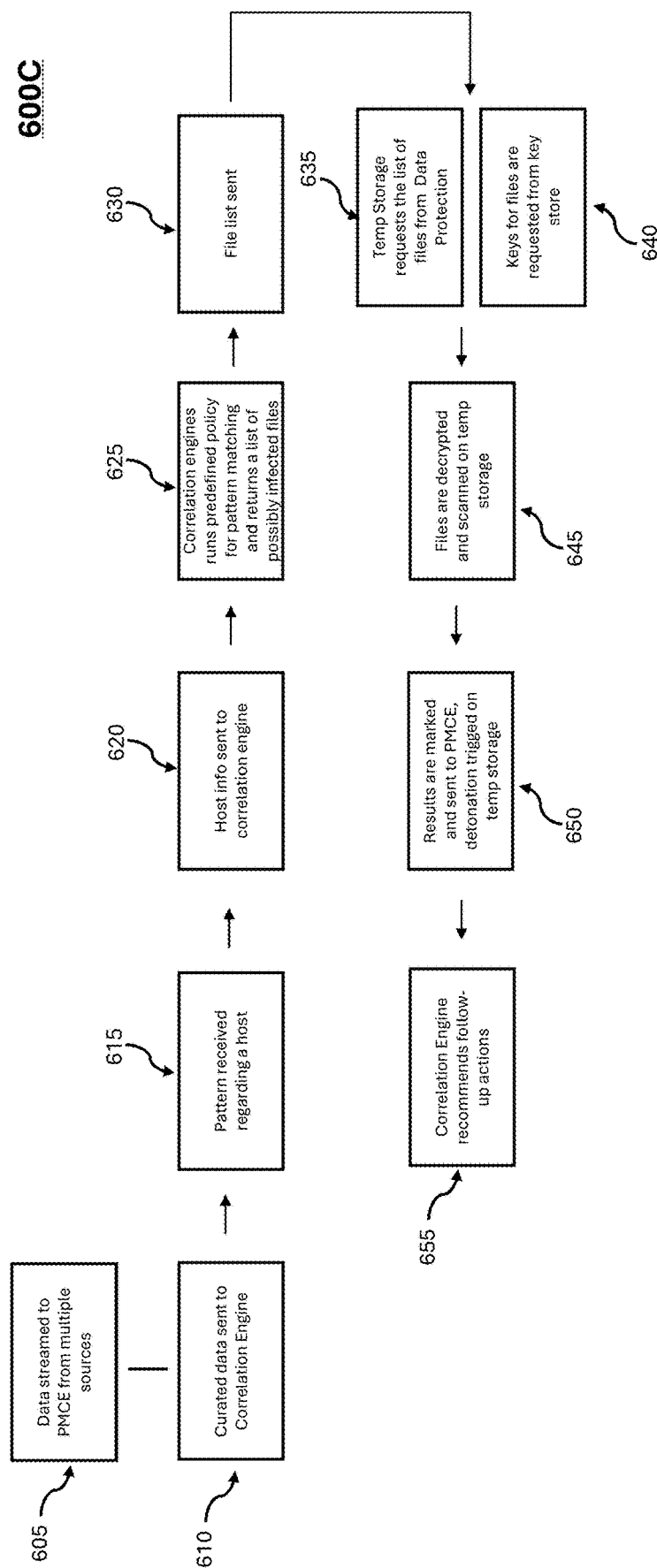

FIG. 6C depicts an exemplary third use-case scenario 600C illustrating insights into encrypted data with anomaly detection that detects anomalies and runs pre-defined patterns.

Figure 6D:
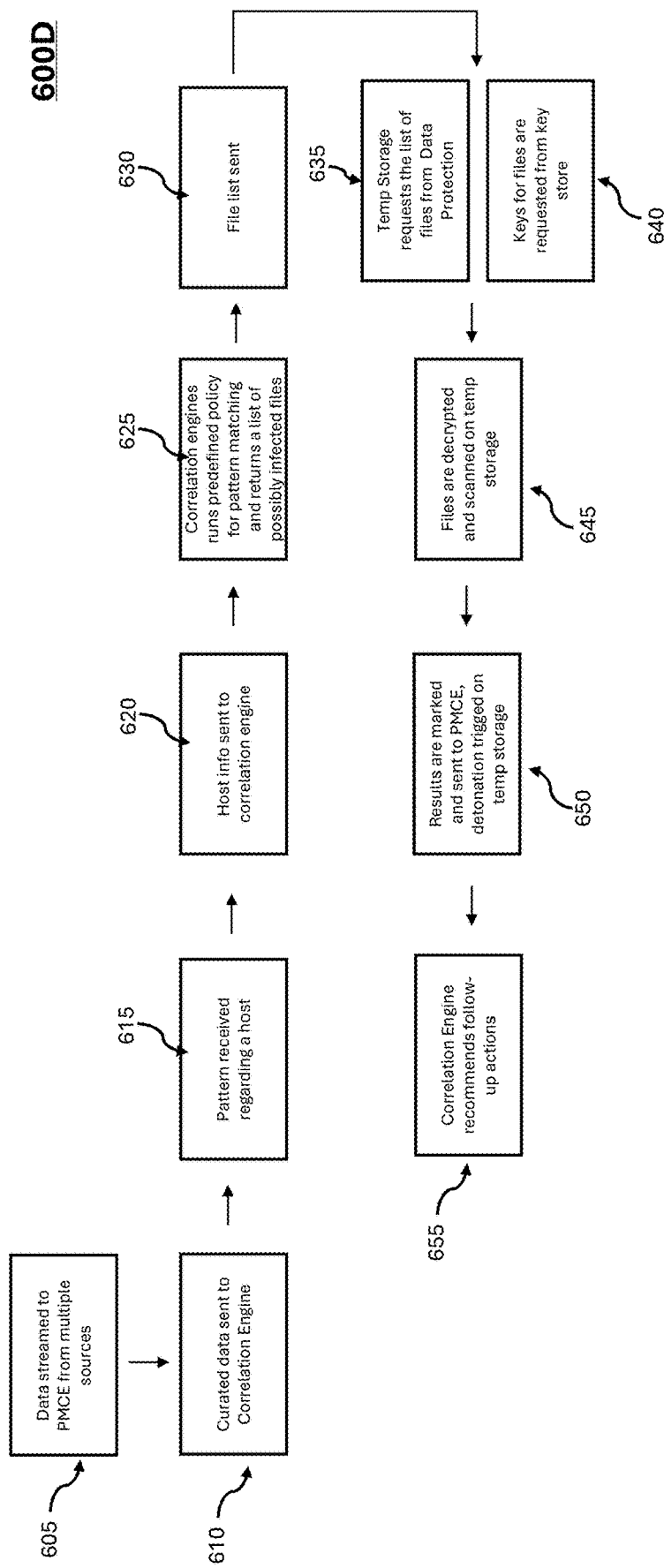

FIG. 6D depicts an exemplary fourth use-case scenario 600D illustrating predictive analytics based on similarities with known patterns and predict potential issues.

The implementation of the exemplary use-case scenarios 600A-600D are similar to each other. For the sake of brevity, only aspects of the specific use-case scenario that are different will be described below. To the extent illustrated in FIG. 6A-6D, similar steps are designated by similar reference numerals.

In general, the methods 600A-D may be implemented by any of the elements of FIGS. 1-5 shown above. The action blocks of the methods 600A-D may begin at any suitable point. Furthermore, the blocks of methods 600A-D may be optionally repeated, looped, recursively executed, executed in various order, or omitted, as necessary. Different blocks of the method 600 may be executed in parallel with other blocks of the methods 600A-D. In addition, further blocks may be executed during the methods 600A-D, such as those described with respect to FIGS. 1-5 or would be apparent to one of skill. Execution of that methods 600A-D may be performed entirely or in part by execution of instructions from a memory by a processor.

In FIG. 6A, at block 605, data is streamed to the PMCE 308 from multiple sources. It is noted that, in certain embodiments, the system sends curated data to the PMCE 308, but not all data is sent. The curated data is sent to the correlation engine 330, at block 610. At block 615, one or more patterns are received regarding a host and at block 620, the host information is sent to the correlation engine 330.

At block 625, the correlation engine 330 runs a predefined policy for pattern matching and returns a list of possibly infected files. At block 630, the file list is sent to the data protection platform 306. At block 635, the temporary storage requests the list of files from the data protection platform 306.

At block 640, keys for the files are requested from the key store. At block 645, files are decrypted using the key and scanned in the temporary storage 316.

At block 650, the results are marked and sent to the PMCE 308 and detonation is triggered in the temporary storage 316. At block 655, the correlation engine 330 recommends follow-up actions.

FIG. 6B depicts an exemplary second use-case scenario 600B illustrating e-discovery capability on encrypted data. As used herein, "e-discovery" means the electronic aspect of identifying, collecting and producing electronically stored information (ESI) in response to a request for production in a law suit or investigation, such as litigation, government investigations, or Freedom of Information requests. ESI includes, but is not limited to, emails, documents, presentations, databases, voicemail, audio and video files, social media, and web sites.

The e-discovery process can often be complex because of the sheer volume of electronic data produced and stored. The electronic documents are dynamic and contain metadata such as time-date stamps, author and recipient information, and file properties. Preserving the original content and metadata for electronically stored information is required in order to eliminate claims of spoliation or tampering with evidence later in the litigation.

In FIG. 6B, to discover e-discovery data, the method 600B searches the network for all the files that includes the term, for example, "XYZ" in one or more data files or within metadata for the predefined pattern. After e-discovery data is identified, potentially relevant documents are placed under a legal hold-meaning they cannot be modified, deleted, erased or otherwise destroyed. Potentially relevant data is collected and then extracted, indexed and placed into a database. At this point, data is analyzed to cull or segregate the clearly non-relevant documents and emails. The data is then hosted in a secure environment and made accessible for review to code the documents for their relevance to the legal matter.

At block 615b, one or more patterns are received regarding custom searchable pattern(s) and at block 620b, the pattern information is sent to the correlation engine 330.

At block 625b, the correlation engine 330 runs a predefined policy for pattern matching within the metadata and returns a list of files that may contain the required encrypted data.

FIG. 6C depicts an exemplary third use-case scenario 600C illustrating insights into encrypted data with anomaly detection that detects anomalies and runs pre-defined patterns. As used herein, "anomaly detection" is the technique of identifying rare events or observations which can raise suspicions by being statistically different from the rest of the observations or from established pattern of behaviors. In various embodiments, the anomalous behavior detected by method 600C can be used to indicate some kind of a problem like a credit card fraud, failing machine in a server, or a cyberattack on the network. However, not all anomalies detected by method 600C are inherently bad. The system and method of the present disclosure is capable of identifying the anomaly and putting them in context to better understand the operation of the network.

For instance, the method 600C, based on the curated telemetry data regarding, for example, the host CPU, memory, or services that are flagged as outlier or abnormal, the host and associations can be identified and flagged to be run against known patterns. The known patterns can be predefined, for example, in the first use-case method 600A, the second use-case method 600B or a combination thereof.

FIG. 6D depicts an exemplary fourth use-case scenario 600D illustrating predictive analytics based on similarities with known patterns and predict potential issues. As used herein, "predictive analytics" refers to the process of using data to predict future trends and events. The process uses historical data combined with data analysis, machine learning, artificial intelligence, and statistical models to find patterns that might predict future behavior.

The fourth use-case method 600D can use historical curated data to identify patterns in previously flagged use-cases to predict files that may be of interest. The files of interest may be run against known use-cases, such as the first use-case method 600A, the second use-case method 600B, the third use-case method 600C or a combination thereof.

The above disclosed subject matter is to be considered illustrative, and not restrictive, and the appended claims are intended to cover all such modifications, enhancements, and other embodiments which fall within the true spirit and scope of the present disclosure. Thus, to the maximum extent allowed by law, the scope of the present disclosure is to be determined by the broadest permissible interpretation of the following claims and their equivalents and shall not be restricted or limited by the foregoing detailed description.

What is claimed is:

1. A method for implementing endpoint detection and response and data protection correlation by utilizing one or more processors and one or more memories, the method comprising:

receiving a telemetry data stream from multiple sources in a network;
analyzing the telemetry data stream from the multiple sources to relate an event to the one or more patterns;
executing a policy for the event when the event matches the one or more patterns to identify suspected encrypted data files;
obtaining an encryption key associated with the suspected encrypted data files;
transferring the encryption key and the suspected encrypted data files to a controlled testing environment configured for using the encryption key to safely decrypt the suspected encrypted data files and for safely testing the suspected encrypted data files to determine, within the controlled testing environment, a potential network impact of executing each of the suspected encrypted files on the network;
determining a specific marker for each of the suspected encrypted files based on the potential network impact;
marking each of the suspected encrypted files with the specific marker;
storing each of the suspected files with the specific marker in one or more storage devices; and
detonating, from the controlled testing environment, any of the suspected encrypted data files confirmed during the testing to have a negative impact on the network;
wherein the telemetry data stream comprises information representing multiple reference use-case scenarios.

2. The method according to claim 1, wherein storing each of the suspected files with the specific marker in the one or more storage devices comprises retaining, in a data protection platform, a single copy of any of the suspected encrypted data files confirmed during the testing to have the negative impact on the network.

3. The method according to claim 1, further comprising: receiving the one or more patterns regarding one or more hosts; identifying the host associated with the event; and identifying the suspected encrypted files based on the identified host.

4. The method according to claim 3, wherein at least one use-case scenario comprises performing a malware detection operation for identifying the suspected encrypted files; and
scanning the suspected encrypted data files in the controlled testing environment after decrypting the suspected encrypted data files to determine whether any of the suspected encrypted data files has been infected with a malware program.

5. The method according to claim 4, further comprising: marking the scanned suspected encrypted data files to indicate whether any of the suspected encrypted data files has been infected with the malware program.

6. The method according to claim 4, wherein the suspected encrypted data files includes an encrypted backup file transferred to the controlled testing environment for decryption to confirm that the encrypted backup file is not corrupted by the malware program before the encrypted backup file is used for data loss recovery.

7. The method according to claim 3, wherein at least one use-case scenario comprises performing an anomaly detection operation for identifying the suspected encrypted files; and
identifying, based on the telemetry data stream, an occurrence of an anomalous event within a network asset;
identifying the host associated with the identified network asset; and matching the identified host in comparison to one or more predefined patterns to provide insight into the potential network impact of executing the suspected encrypted files on the network.

8. The method according to claim 3, wherein at least one use-case scenario comprises performing a predictive analytics operation for identifying the suspected encrypted files;
identifying, based on historical data curated from the telemetry data stream, one or more predefined patterns identified in the multiple reference use-case scenarios to predict one or more data files of interest; and
matching the one or more data files of interest in comparison to the one or more predefined patterns to provide insight into the potential network impact of executing the suspected encrypted files on the network.

9. The method according to claim 1, further comprising: receiving the one or more patterns regarding one or more custom searchable patterns;
wherein at least one use-case scenario comprises performing an e-discovery operation for identifying the suspected encrypted files; and
scanning the network for critical files that includes a predetermined term or scanning the telemetry data stream to identify a predetermined pattern to generate a list of the suspected encrypted files to provide insight into the impact of executing the suspected encrypted files on the network.

10. The method according to claim 1, further comprising monitoring and collecting data from endpoints of a data center; and
using an artificial intelligence and machine learning operation to execute the policy to provide automated insight into the data collected from the endpoints to identify a data center issue.

11. The method according to claim 10, further comprising: determining follow-up actions to resolve the data center issue based on the policy determined when the event matches the one or more patterns.

12. The method according to claim 3, further comprising: providing, to the identified host of the suspected encrypted data file, proof of the detonation of the suspected encrypted data file from the controlled testing environment.

13. The method according to claim 1, further comprising: providing customizable pattern capability by dynamically searching for, defining and detecting, in real-time, the one or more patterns regarding a host.

14. A system for implementing endpoint detection and response and data protection correlation, the system comprising:
a correlation engine that receives a telemetry data stream from multiple sources;
the correlation engine receives one or more patterns;
a processor coupled to the correlation engine via a communication network, wherein the processor is configured to:
analyze the telemetry data stream from the multiple sources to relate an event to the one or more patterns;
execute a policy for the event when the event matches the one or more patterns to identify suspected encrypted data files;
obtain an encryption key associated with the suspected encrypted data files;
transfer the encryption key and the suspected encrypted data files to a controlled testing environment configured for using the encryption key to safely decrypt the suspected encrypted data files and for safely testing the suspected encrypted data files to determine, within the controlled testing environment, a potential network impact of executing each of the suspected encrypted files on the network;

determine a specific marker for each of the suspected encrypted files based on the potential network impact;

mark each of the suspected encrypted files with the specific marker;

store each of the suspected files with the specific marker in one or more storage devices; and detonate, from the controlled testing environment, any of the suspected encrypted data files confirmed during the testing to have a negative impact on the network;

wherein the telemetry data stream comprises information representing multiple reference use-case scenarios.

15. The system according to claim 14, wherein the processor is further configured to: receive the one or more patterns regarding one or more hosts;

identify the host associated with the event; and identify the suspected encrypted files based on the identified host.

16. The system according to claim 15, wherein at least one use-case scenario comprises performing a malware detection operation for identifying the suspected encrypted files; and wherein the processor is further configured to scan the suspected encrypted data files in the controlled testing environment after decrypting the suspected encrypted data files to determine whether any of the suspected encrypted data files has been infected with a malware program.

17. The system according to claim 15, wherein at least one use-case scenario comprises performing an anomaly detection operation for identifying the suspected encrypted files; and wherein the processor is further configured to:

identify, based on the telemetry data stream, an occurrence of an anomalous event within a network asset;

identify the host associated with the identified network asset; and match the identified host in comparison to one or more predefined patterns to provide insight into the potential network impact of executing the suspected encrypted files on the network.

18. The system according to claim 14, wherein at least one use-case scenario comprises performing an e-discovery operation for identifying the suspected encrypted files; and wherein the processor is further configured to: receive the one or more patterns regarding one or more custom searchable patterns; and scan the network for critical files that includes a predetermined term or scanning the telemetry data stream to identify a predetermined pattern to generate a list of the suspected encrypted files to provide insight into the impact of executing the suspected encrypted files on the network.

19. A non-transitory computer readable medium configured to store instructions for implementing endpoint detection and response and data protection correlation, wherein, when executed, the instructions cause a processor to perform the following:

receiving a telemetry data stream from multiple sources in a network;

analyzing the telemetry data stream from the multiple sources to relate an event to the one or more patterns;

executing a policy for the event when the event matches the one or more patterns to identify suspected encrypted data files;

obtaining an encryption key associated with the suspected encrypted data files;

transferring the encryption key and the suspected encrypted data files to a controlled testing environment configured for using the encryption key to safely decrypt the suspected encrypted data files and for safely testing the suspected encrypted data files to determine, within the controlled testing environment, a potential network impact of executing each of the suspected encrypted files on the network;

determining a specific marker for each of the suspected encrypted files based on the potential network impact;

marking each of the suspected encrypted files with the specific marker;

storing each of the suspected files with the specific marker in one or more storage devices; and detonating, from the controlled testing environment, any of the suspected encrypted data files confirmed during the testing to have a negative impact on the network;

wherein the telemetry data stream comprises information representing multiple reference use-case scenarios.

* * * * *